United States Patent [19]

English, II

[11] Patent Number: 5,727,695
[45] Date of Patent: Mar. 17, 1998

[54] COMPACT DISC STORAGE RACK

[76] Inventor: James A. English, II, 11425 Sorrento Valley Rd., San Diego, Calif. 92121

[21] Appl. No.: 338,232

[22] Filed: Nov. 14, 1994

[51] Int. Cl.$^6$ ......................................... A47F 7/00
[52] U.S. Cl. ......................... 211/40; 211/41.12; D6/407; 206/308.1; 312/9.9
[58] Field of Search ................. 211/40, 41; D6/407; 206/308.1, 308.3, 387.15, 455, 456; 312/9.9

[56] References Cited

U.S. PATENT DOCUMENTS

| | | | |
|---|---|---|---|
| 2,288,317 | 6/1942 | Greenberg | 211/40 |
| 4,723,662 | 2/1988 | Johnson | 211/41 |
| 5,038,942 | 8/1991 | Wright | 211/40 |
| 5,178,284 | 1/1993 | Wojewoda | 211/40 |
| 5,188,240 | 2/1993 | Marino et al. | 206/308.1 X |
| 5,301,819 | 4/1994 | Moeken | 211/40 |

*Primary Examiner*—Robert W. Gibson, Jr.

[57] ABSTRACT

A space-saving storage rack for compact discs in individual boxes. The rack has two parallel rows of alternately positioned corner brackets and spacers. Each corner bracket in one row has an opposite spacer in the other row and vice versa. The distance between the corner bracket and its opposite spacer is slightly longer than an edge of a compact disc box. The spacers in each row extends horizontally by an offset distance ranging from 10 mm to 25 mm nearer to the other row than the respective adjacent corner brackets. The widths of each spacer and corner bracket are approximately equal to the thickness of a CD box. The rack enables a stack of compact disc boxes to be stored in a vertical position in which each box is held by a corner bracket at one lower corner and a spacer at the other lower corner. The compact disc boxes are stacked in staggered positions to facilitate easy removal of any individual box from the stack, and the compact disc boxes are stacked in contact with each other with no space-wasting partition members in between adjacent boxes.

4 Claims, 2 Drawing Sheets

COMPACT DISC STORAGE RACK

BACKGROUND OF THE INVENTION

This invention pertains to the storage of compact discs (CD's) in their original individual boxes. It provides a space-efficient storage rack for boxed compact discs. The CD's in their boxes are stored in a vertical position with every box on the storage rack in easy reach.

With the increase in popularity of compact discs for musical entertainment and other applications comes a growing demand for space-efficient storage for compact discs. Currently, most compact discs are provided in individual boxes of standard size. The boxes provide protection and easy identification of the discs. It is therefore desirable to store the compact disc in their respective original boxes. It is furthermore desirable to store the compact disc in a vertical position to enhance access and visibility of the labels.

The most space-efficient way to store a collection of boxed compact disc is to stack the boxes in face-to-face contact with all edges evenly aligned. However, it is difficult to remove a compact disc from such a stack, difficult to replace a compact disc into storage, and, if several are removed, the others may fall over. To allow easy removal of a boxed disc from storage without disturbing neighboring discs, some storage systems use partitions between every disc in storage, but the use of partitions between discs is not desirable because it requires additional storage space.

Removal of a CD box from a storage stack without partitions can be easy if the boxes were stacked in a such an arrangement that some portion of each box sticks out to serve as a handle by which that particular box can be gripped and removed.

A compact disc stand is described in U.S. Pat. No. 5,178,284 in which the boxes are staggered diagonally. Thus some portion of every box sticks out to serve as a handle, allowing individual boxed discs to be easily removed; and there is no need for the use of any partitions. Even so, the stand of U.S. Pat. No. 5,178,284 is not space-efficient because the compact disc boxes are stored with their edges at an oblique angle.

SUMMARY OF THE INVENTION

The present invention provides a space-saving storage rack for compact discs in individual boxes. The rack has two parallel rows of alternately positioned corner brackets and spacers. Each corner bracket in one row has an opposite spacer in the other row and vice versa. The distance between the corner bracket and its opposite spacer is slightly longer than an edge of a compact disc box. The spacers in each row extends horizontally by an offset distance ranging from 10 mm to 25 mm nearer to the other row than the respective adjacent corner brackets. The widths of each spacer and corner bracket are approximately equal to the thickness of a cd box. The rack enables a stack of compact disc boxes to be stored in a vertical position in which each box is held by a corner bracket at one lower corner and a spacer at the other lower corner. The compact disc boxes are stacked in a staggered positions to facilitate easy removal of any individual box from the stack, and the compact disc boxes are stacked in contact with each other with no space-wasting partition members between adjacent boxes.

DETAILED DESCRIPTION OF THE INVENTION

Figure 1:
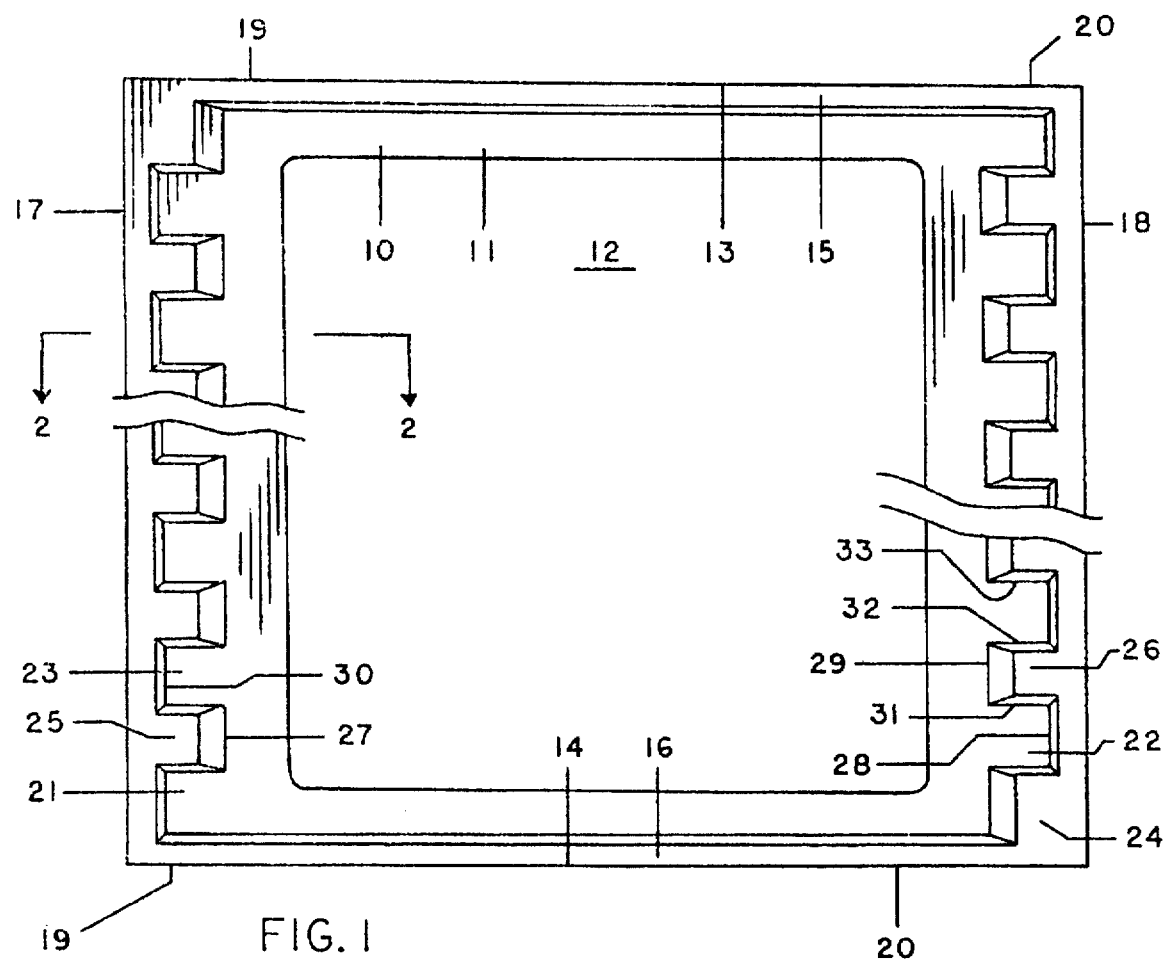
FIG. 1 shows a plan view of a compact disc storage rack which is a preferred embodiment of the present invention.

A plan view of a space-saving rack 10 according to the present invention for storage of individuality boxed compact discs is shown in FIG. 1. At the base of the rack is a horizontally positioned flat plate 11. This plate 11 may have optional holes 12 to reduce weight and material. Plate 11 may also have mounting holes for attaching the rack to a shelf or drawer. At both ends 13 and 14 of the rack are walls 15 and 16; and along the two sides 17 and 18 of the rack are two rows 19 and 20 of alternately positioned corner brackets 21, 22 and 23 and spacers 24, 25 and 26.

Figure 2:
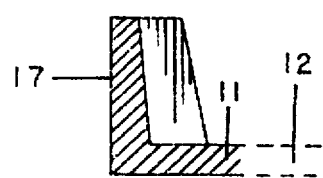
FIG. 2 shows a sectional view taken from the line 2—2 of FIG. 1.

FIG. 2 shows a sectional view taken form the line 2—2 in FIG. 1.

Figure 3:
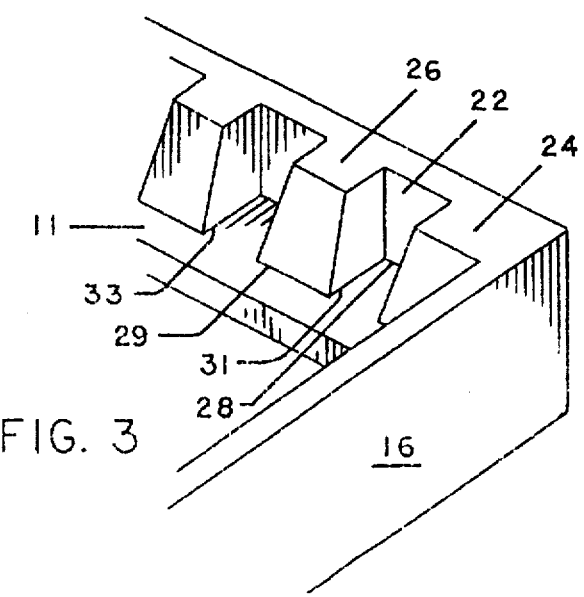
FIG. 3 shows a perspective view of one corner of the rack of FIG. 1.

FIG. 3 is a perspective view showing a wall 16, a corner bracket 22 and spacers 24 and 26 extending up vertically from the plane of the plate 11.

FIG. 1 shows that every corner bracket in a row (except the ones at the ends of the row) is positioned adjacent to two spacers and vice versa. Furthermore, every corner bracket in a given row is opposite to a spacer in the other row—for example, corner bracket 21 in row 19 is opposite to spacer 24 in row 20; corner bracket 22 in row 20 is opposite to spacer 25 in row 19, etc.

The distance between a spacer and its opposite corner bracket is slightly greater than the length of the bottom edge of a CD box. This distance is measured between the respective bottom edges eg. 27–28, 29–30 etc.

A standard CD box is not exactly square; it is typically 125 mm×142 mm×10 mm with the label on the 125 mm side; therefore, for racks in which the CD boxes are stored with the labels on top, the distance between a spacer and its opposite corner bracket should be slightly over 125 mm (5"), and for racks in which the CD boxes are stored with the labels along the side(s), the distance between a spacer and its opposite corner bracket should be slightly more than 142 mm (5.5").

The widths of the spacers and corner brackets are such that adjacent CD boxes are stacked in contact with each other. These widths are measured across the respective bottom edges, ie. 31–32, 32–33 etc. Ideally, the width of the spacers should be slight less than the thickness of the CD box which is typically 10 mm and the width of the corner brackets should be slightly greater than the thickness of the CD box.

The two rows 19 and 20 of spacers and corner brackets are held in their predetermined relative positions by structural means, which in the case of the embodiment of FIGS. 1–3, comprise the base plate 11 and end walls 15 and 16.

In use, the rack 10 is placed on a horizontal plane (such as a table, a shelf, or the bottom of a drawer). A first CD box is place (vertically, on an edge) with one lower corner against a corner bracket (say 21) and the other lower corner against the opposite spacer 24. Other CD boxes are also placed vertically with one lower corner against a corner bracket and the other lower corner against the opposite spacer.

It is evident from observing FIG. 1 that the CD boxes in the rack 10 are stacked in a staggered arrangement. Adjacent CD boxes are displaced along a left-right direction by an offset distance which is the distance between the bottom edges of adjacent corner brackets and spacers (for example, the distance between bottom edge 28 and 29, or between 27 and 30). Because of this staggering, some part of every CD box always sticks out to serve as a handle with which that particular CD box can be easily removed from storage. For this purpose, an offset distance of approximately 15 mm is found to be satisfactory.

The vertical dimensions of the spacers and the corner brackets are not critical as long as they are tall enough to hold the CD boxes in a substantially vertical position. For this purpose, a vertical height of approximately 25 mm (1 inch) is found to be satisfactory. The vertical surfaces of the spacers and the corner brackets are drafted 5–20 degrees to facilitate insertion and removal of the CD boxes.

Another function of the staggered arrangement is to provide some areas on the faces of the CD boxes for the spacers to grasp onto while holding the CD boxes in their vertical positions. If the stack of CD boxes are not staggered, then the CD boxes can be held by the face only with the use of partitions. The use of partitions wastes precious storage space.

The storage rack described in FIGS. 1–3 is suitable for manufacture out of a wide variety of materials including plastics (such as ABS).

The dimensions of the rack must depend ultimately on the dimensions of the CD boxes to be stored. At the present time, the dimensions of boxes for single CD's are quite uniform (approximately 125 mm×142 mm×10 mm). Therefore a storage rack built to following ranges of dimensions can be expected to be workable.

| | |
|---|---|
| distance between the corner bracket and its opposite spacer: | 125 mm to 150 mm |
| (labels on top | 125 mm to 135 mm |
| labels on the side | 142 mm to 150 mm) |
| offset distance between corner bracket and its adjacent spacer: | 10 mm to 25 mm |
| vertical height of corner brackets and spacer: | 10 mm to 75 mm |
| width of spacer: | 8 mm to 15 mm |
| width of corner bracket: | 10 mm to 15 mm |

Figure 4:
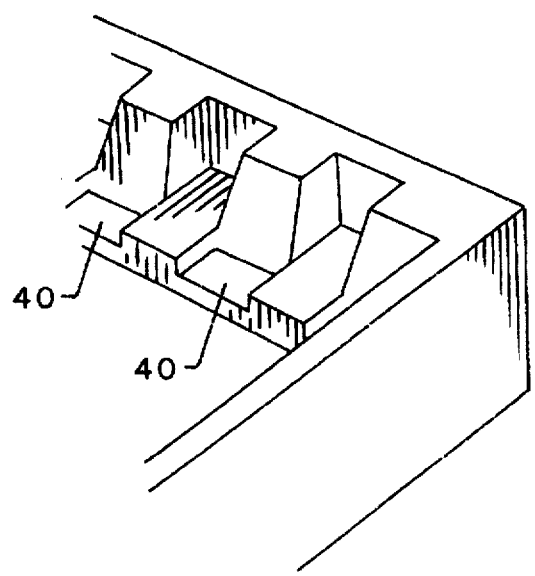
FIG. 4 shows a perspective view of one corner of another preferred embodiment of the present invention.

FIG. 4 shows a perspective view (similar to the view of FIG. 3) of a part of another preferred embodiment of the present invention. In addition to having the features of the embodiment shown in FIGS. 1–3, the embodiment of FIG. 4 also have indentations 40 by the spacers. These indentations serve to maintain a CD box positioned by the spacer. In the embodiment of FIGS. 1–3, the CD box is maintained in position by friction and by the presence of adjacent CD boxes whose positions are in turn maintained by the corner brackets. The addition feature of having the indentations provide more positive positioning of the CD boxes, especially in the absence of adjacent cd boxes.

It is found satisfactory to have the indentations having widths ranging from 10 mm to 15 mm and depths ranging from 1 mm to 20 mm.

The combined effects of the horizontal offset positioning and vertical displacement due to the indentations causes a rotational staggering of the CD boxes: Adjacent CD boxes in the stack differ in orientations. However, whether it is staggered horizontally or rotationally, as long as the stack is staggered, some part of every CD box will be sticking out to facilitate removal of a CD from the stack.

Figure 5:
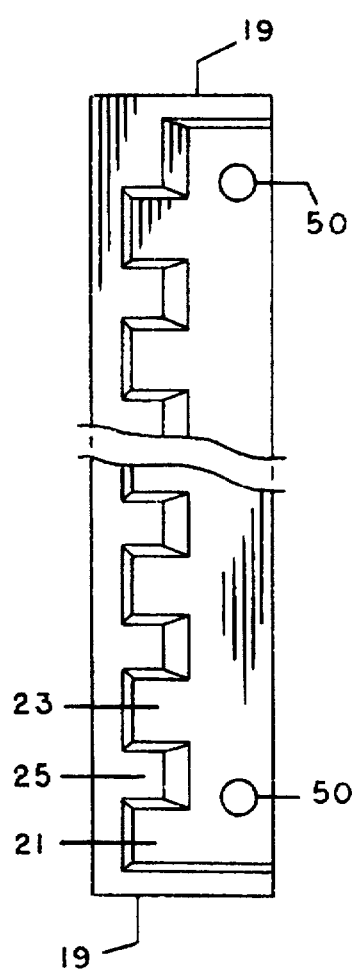
FIG. 5 shows a plan view of a part of a compact disc storage rack which is a third preferred embodiment of the present invention.

FIG. 5 shows a part of still another embodiment of the present invention. The embodiment of FIG. 5 is similar to that of FIG. 1 except that the two rows of corner brackets and spacers are in separate pieces for easy shipping and storage of the rack material; (a left piece is shown in FIG. 5; a complete rack would also have a right piece, not shown in FIG. 5, but similar to the right hand part of the rack in FIG. 1). In use, the left and right pieces are fastened to a solid surface, thus being maintained in a predetermined relative position. The left piece shown in FIG. 5 have holes 50 through which nails or screws can be placed for fastening. Alternative means for fastening (such as the use of adhesives) may also be use. Whatever means for fastening the left and right pieces to a solid surface become part of the structural support means to maintain the rows at a predetermined relative position.

I claim:

1. A space-saving storage rack from compact discs in individual boxes comprising:

a) a first elongated side, said first elongated side comprising a first row of alternately positioned corner brackets and spacers, b) a second elongated side, said second elongated side comprising a second row of alternately positioned corner brackets and spacers, c) structural support means to maintain said second row at a predetermined position with respect to said first row, with said first and second rows lying substantially parallel to each other on a horizontal plane, and each corner bracket in said first row being positioned opposite to a spacer in the second row and vice versa, the distance from each corner bracket to its opposite spacer ranging from 125 mm to 150 mm, d) the spacers in each row extending 10 mm to 25 mm beyond the adjacent corner brackets toward the opposite row, e) said spacers and corner brackets each being 10 mm to 75 mm in height, f) said spacers and said corner brackets each being 8 mm to 15 mm in width, thereby enabling compact disc boxes to be stored in a substantially vertical fashion, in which each box is held by a corner bracket at one lower corner and a spacer at the other lower corner, the boxes arranged in staggered positions to facilitate easy removal of any individual box, the boxes being stacked against each other with no space between adjacent boxes.

2. A rack according to claim 1 wherein said distance between said corner bracket and said opposite spacer ranges from 125 mm to 135 mm for storage of CD boxes at such positions that the labels are on top.

3. A rack according to claim 1 wherein said distance between said corner bracket and said opposite spacer ranges from 142 mm to 150 mm for storage of CD boxes at such positions that the labels are on the side.

4. A rack according to claim 1 further comprising indentations by the spacers to maintain a CD box positioned by the spacer, said indentations having widths ranging from 10 mm to 15 mm and depths ranging from 1 mm to 20 mm.

* * * * *